United States Patent
Dua et al.

(10) Patent No.: US 11,880,309 B2
(45) Date of Patent: Jan. 23, 2024

(54) METHOD AND SYSTEM FOR TRACKING STATE OF CACHE LINES

(71) Applicant: VMware, Inc., Palo Alto, CA (US)

(72) Inventors: Nishchay Dua, Pleasanton, CA (US); Andreas Nowatzyk, San Jose, CA (US); Isam Wadih Akkawi, Santa Clara, CA (US); Pratap Subrahmanyam, Saratoga, CA (US); Venkata Subhash Reddy Peddamallu, Sunnyvale, CA (US); Adarsh Seethanadi Nayak, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 191 days.

(21) Appl. No.: 17/355,941

(22) Filed: Jun. 23, 2021

(65) Prior Publication Data

US 2022/0414017 A1  Dec. 29, 2022

(51) Int. Cl.
  *G06F 12/0897* (2016.01)
  *G06F 12/0831* (2016.01)
  *G06F 12/0862* (2016.01)

(52) U.S. Cl.
  CPC ...... *G06F 12/0897* (2013.01); *G06F 12/0833* (2013.01); *G06F 12/0862* (2013.01); *G06F 2212/152* (2013.01)

(58) Field of Classification Search
  CPC ............. G06F 12/0897; G06F 12/0833; G06F 12/0862; G06F 2212/152
  See application file for complete search history.

(56) References Cited

U.S. PATENT DOCUMENTS

| | | | | |
|---|---|---|---|---|
| 6,748,490 | B1* | 6/2004 | Morein | G06F 12/0897 |
| 2013/0311724 | A1* | 11/2013 | Walker | G06F 12/0811 |
| | | | | 711/E12.071 |
| 2015/0074355 | A1* | 3/2015 | Sampathkumar | G06F 12/123 |
| | | | | 711/135 |
| 2020/0034297 | A1 | 1/2020 | Calciu et al. | |
| 2022/0107895 | A1* | 4/2022 | Holmberg | G06F 9/4812 |
| 2022/0137860 | A1* | 5/2022 | Zhuo | G06F 3/0604 |
| | | | | 711/154 |

* cited by examiner

*Primary Examiner* — Michael Krofcheck
(74) *Attorney, Agent, or Firm* — Kim & Stewart LLP (57) ABSTRACT

The state of cache lines transferred into an out of caches of processing hardware is tracked by monitoring hardware. The method of tracking includes monitoring the processing hardware for cache coherence events on a coherence interconnect between the processing hardware and monitoring hardware, determining that the state of a cache line has changed, and updating a hierarchical data structure to indicate the change in the state of said cache line. The hierarchical data structure includes a first level data structure including first bits, and a second level data structure including second bits, each of the first bits associated with a group of second bits. The step of updating includes setting one of the first bits and one of the second bits in the group corresponding to the first bit that is being set, according to an address of said cache line.

18 Claims, 6 Drawing Sheets

METHOD AND SYSTEM FOR TRACKING STATE OF CACHE LINES

BACKGROUND

In many applications running in a computing system, including a virtualized system, modified data in memory is tracked at the page level using page tables. If a small data item, such as a cache line is modified, then the entire page is declared to be dirty and this fact is recorded in a page table entry in the page tables for the application because the page is the smallest item in the system that can be tracked. Eventually, the entire page must be written back to persistent storage. This is inefficient, especially when only a small part of the page is modified.

A method of using cache coherent FPGAs to track dirty cache lines is disclosed in U.S. patent application Ser. No. 16/048,180, the entire contents of which are incorporated by reference herein. In this method, the FPGA monitors cache coherence events relating to CPU caches via a coherence interconnect (UPI/CXL/CCIX) and stores the addresses of the dirty cache lines in memory. Using this method, only the dirty cache lines in memory need to be written back to persistent storage. Although this method improves writeback efficiency, the memory and bandwidth requirements for tracking the cache lines can be quite significant because the number of cache lines that are tracked are in the millions.

SUMMARY

A method of tracking the state of cache lines that are transferred into and out of one or more caches of processing hardware, according to one or more embodiments, includes monitoring the processing hardware for cache coherence events on a coherence interconnect that is connected between the processing hardware and monitoring hardware, determining, based on the monitoring, that the state of a cache line has changed from a first state to a second state, and updating a hierarchical data structure to indicate the change in the state of said cache line from the first state to the second state. The hierarchical data structure includes a first level data structure including a plurality of first bits, and a second level data structure including a plurality of second bits, each of the first bits associated with a group of the second bits. The step of updating includes setting one of the first bits and one of the second bits in the group corresponding to the first bit that is being set, according to an address of said cache line.

Further embodiments include a non-transitory computer-readable storage medium comprising instructions that cause a computer system to carry out the above method, as well as a computer system configured to carry out the above method.

DETAILED DESCRIPTION

One or more embodiments provide an improved method of tracking states of cache lines, e.g., whether or not the cache lines are modified, exclusive, shared, or invalid. Embodiments employ a cache line tracker that stores cache line state information in a data structure that is indexed based on the cache line address. The cache line tracker is implemented as an N-level hierarchical bitmap structure that keeps track of the states of all cache lines in FPGA memory. The N-level hierarchical bitmap structure is advantageous because cache lines are sparsely populated in memory and the hierarchical structure helps in searching large regions of memory quickly.

Figure 1:
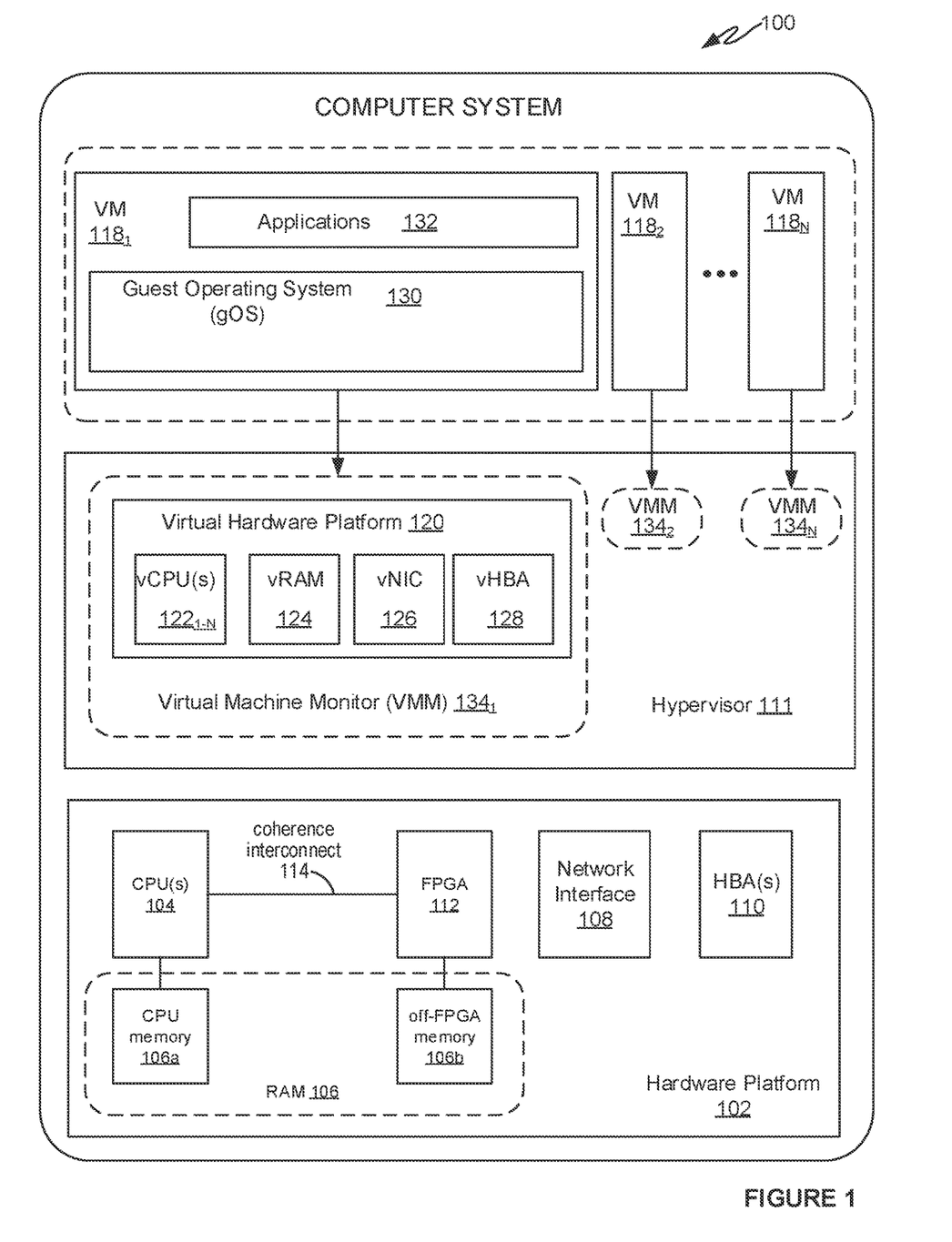
FIG. 1 is a block diagram of a computer system that is representative of a virtualized computer architecture in which embodiments may be implemented.

FIG. 1 is a block diagram of a computer system that is representative of a virtualized computer architecture in which embodiments may be implemented. As is illustrated, computer system 100 hosts multiple virtual machines (VMs) $118_1$-$118_N$ that run on and share a common hardware platform 102. Hardware platform 102 includes conventional computer hardware components, such as one or more items of processing hardware such as central processing units (CPUs) 104, random access memory (RAM) 106 as system memory, one or more network interfaces 108 for connecting to a network, and one or more host bus adapters (HBA) 110 for connecting to a storage system. In addition, hardware platform 102 includes a field programmable gate array (FPGA) 112, which is installed in a CPU socket and communicates with one or more CPUs 104 via coherence interconnect 114. Coherence interconnect 114 may be any point-to-point coherence interconnect between processors, such as the Intel® UltraPath Interconnect (UPI), which is a successor to the Intel® QuickPath Interconnect (QPI), which supports a cache coherence protocol. In another embodiment, coherence interconnect 114 is a Compute Express Link™ (CXL™) operating with CXL-cache/mem protocols. Though the following description has the FPGA occupying a CPU socket, the embodiments are not so limited; any arrangement of the FGPA that includes a connection to the coherence interconnect among processors present in computer system 100 is sufficient.

A virtualization software layer, referred to hereinafter as hypervisor 111, is installed on top of hardware platform 102. Hypervisor 111 makes possible the concurrent instantiation and execution of one or more VMs $118_1$-$118_N$. The interaction of a VM 118 with hypervisor 111 is facilitated by the virtual machine monitors (VMMs) 134. Each VMM $134_1$-$134_N$ is assigned to and monitors a corresponding VM $118_1$-$118_N$. In one embodiment, hypervisor 111 may be a hypervisor implemented as a commercial product in VMware's vSphere® virtualization product, available from VMware Inc. of Palo Alto, Calif. In an alternative embodiment, hypervisor 111 runs on top of a host operating system which itself runs on hardware platform 102. In such an embodiment, hypervisor 111 operates above an abstraction level provided by the host operating system.

After instantiation, each VM $118_1$-$118_N$ encapsulates a virtual hardware platform that is executed under the control of hypervisor 111, in particular the corresponding VMM 134$_1$-134$_N$. For example, virtual hardware devices of VM 118$_1$ in virtual hardware platform 120 include one or more virtual CPUs (vCPUs) 122$_1$-122$_N$, a virtual random access memory (vRAM) 124, a virtual network interface adapter (vNIC) 126, and virtual HBA (vHBA) 128. Virtual hardware platform 120 supports the installation of a guest operating system (guest OS) 130, on top of which applications 132 are executed in VM 118I. Examples of guest OS 130 include any of the well-known commodity operating systems, such as the Microsoft Windows® operating system, the Linux® operating system, and the like.

It should be recognized that the various terms, layers, and categorizations used to describe the components in FIG. 1 may be referred to differently without departing from their functionality or the spirit or scope of the disclosure. For example, VMMs 134$_1$-134$_N$ may be considered separate virtualization components between VMs 118$_1$-118$_N$ and hypervisor 111 since there exists a separate VMM for each instantiated VM. Alternatively, each VMM may be considered to be a component of its corresponding virtual machine since each VMM includes the hardware emulation components for the virtual machine.

Figure 2:
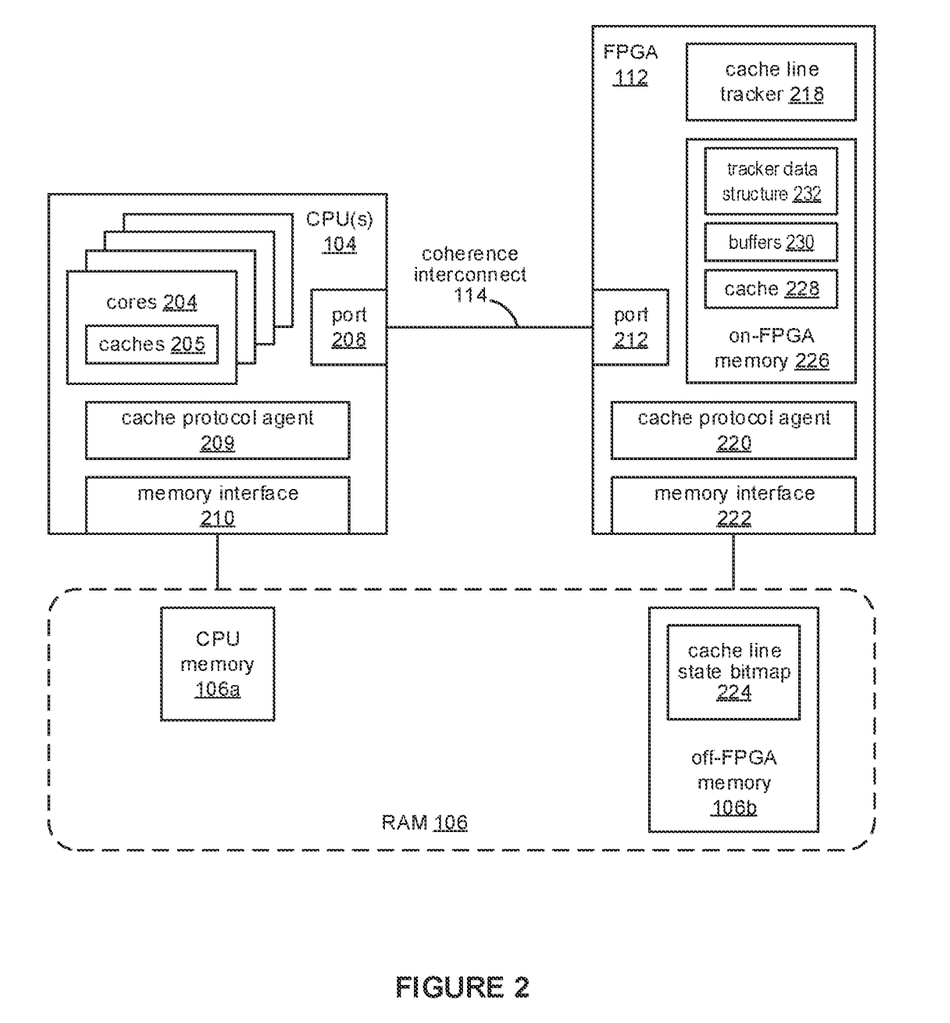
FIG. 2 is a block diagram that depicts a CPU, an FPGA, and system memory of the computer system of FIG. 1 in more detail.

FIG. 2 is a block diagram that depicts a CPU, an FPGA, and system memory of the computer system of FIG. 1 in more detail. Each CPU 104 includes one or more processing cores 204, caches 205 for cores 204 (often implemented as a hierarchy of multiple cache levels), a cache protocol agent 209 for enforcing the cache coherence protocol, a communications port 208 connected to coherence interconnect 114, and a memory interface 210 to CPU memory 106a, which is allocated from RAM 106. FPGA 112 is configured with a cache line tracker 218, which will be described below, an on-FPGA memory 226 that backs a cache 228, buffers 230, and a tracker data structure 232, a cache protocol agent 220 for enforcing the cache coherence protocol, a communications port 212 connected to coherence interconnect 114, and a memory interface 222 to off-FPGA memory 106b, which is allocated from RAM 106. In general, on-FPGA memory 226 has higher memory access speeds than off-FPGA memory 106b. Because of the higher performance, it is more expensive and thus its storage capacity is not as large as the storage capacity of off-FPGA memory 106b.

Data are transferred between memory (e.g., CPU memory 106a) and cache (e.g., caches 205) in blocks of fixed size, called cache lines or cache blocks. When a cache line is copied from memory into cache, a cache entry is created, which includes the copied data as well as the corresponding memory address. When the CPU needs to read or write to a particular address in memory, it first checks for a corresponding entry in the cache. If the CPU finds the corresponding entry in the cache, a cache hit has occurred; the CPU immediately reads the data from the cache line or writes the data in the cache line. However, if the CPU does not find the corresponding entry in the cache, a cache miss has occurred. In response to the cache miss, a new cache line is allocated in the cache and data from memory is copied into the new cache line. A read or write is then performed on the newly allocated cache line with the copied contents.

Cache coherence on coherence interconnect 114 is maintained according to a standard protocol, such as modified, exclusive, shared, invalid (MESI) protocol or modified, exclusive, shared, invalid, forwarded (MESIF) protocol. In these protocols, cache lines marked invalid signify that the cache line has invalid data and must be brought into the cache from memory accessible by the cache. Cache lines marked exclusive, shared and forwarded (in the MESIF protocol) all signify that the cache line has valid data, but the cache line is clean (not modified), so the cache line can be discarded without writing the cache line back the data to memory. A cache line marked as modified signifies one that holds a modified or dirty cache line, and must be written back to memory before the cache line is discarded from the cache. Cache protocol agents 209, 220, and communication ports 208, 212 support a coherence protocol, such as the ones described above. Cache protocol agents 209, 220 can initiate and respond to transactions on coherence interconnect 114 by sending and receiving messages on the interconnect through their respective communication ports 208, 212. In addition, cache line tracker 218 of FPGA 112 monitors cache coherence events on coherence interconnect 114 through communication port 212.

When a CPU accesses a cache line that is not in its cache, cache protocol agent 209 of the CPU requests the cache line from memory. Thus, cache protocol agent 209 of the CPU issues a load cache line transaction on coherence interconnect 114. This can be 'Load Shared' for sharing the cache line, or 'Load Exclusive' for cache lines that will be modified. A cache line that is loaded as 'Exclusive' is considered potentially dirty, because it is not certain the cache line will be modified. When the cache line gets evicted from the cache, if it is modified, it must be written back to the memory from which it originated. The operation of writing the cache line back is present on coherence interconnect 114 as a writeback transaction and can be monitored for tracking dirty cache lines In the case of a writeback transaction, the cache line is actually dirty, rather than potentially dirty. To confirm whether a cache line that is potentially dirty is actually dirty or not, cache protocol agent 220 in FPGA 112, can snoop the cache line in accordance with the coherence interconnect protocol. This causes a writeback transaction to be triggered and noticed by cache protocol agent 220 if the cache line is dirty.

In one or more embodiments, the state of cache lines is tracked by cache line tracker 218, which is configured in FPGA 112. Cache line tracker 218 acquires cache line events from cache protocol agent 220 and records state changes in the cache lines in a cache line state bitmap 224, which is stored in off-FPGA memory 106b. To speed up memory accesses to cache line state bitmap 224, a cache 228 is configured in on-FPGA memory 226. Data are transferred between off-FPGA memory 106b and cache 228 in blocks of fixed size, called cache lines or cache blocks. To distinguish between cache lines of caches 205 and cache lines of cache 228, cache lines of caches 205 is hereinafter referred to as "cache lines" and cache lines of cache 228 is hereinafter referred to as "cache blocks." Buffers 230 include a pending buffer 230A (shown in FIG. 3) in which cache line state information is temporarily stored when there is a cache miss, until a cache block corresponding to the cache line is fetched from off-FPGA memory 106b, and a victim buffer 230B (shown in FIG. 3) in which evicted cache blocks are temporarily stored until they are written out to off-FPGA memory 106b. In addition, to speed up the search of cache line states, cache line tracker 218 maintains a hierarchical data structure depicted in FIG. 2 as tracker data structure 232.

Figure 3:
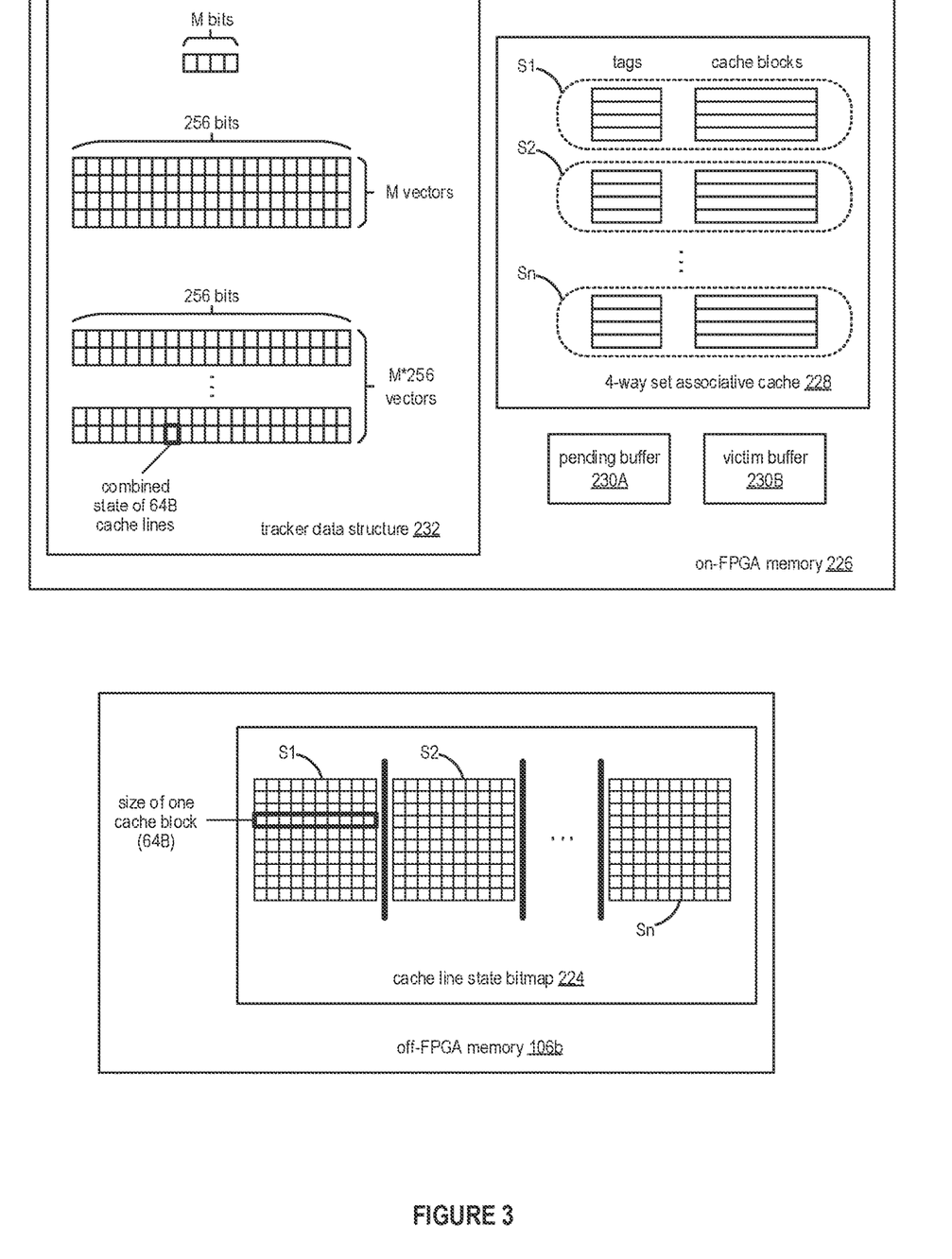
FIG. 3 is a diagram that illustrates data structures, buffers, and a cache that are employed in the embodiments.

FIG. 3 illustrates tracker data structure 232, cache 228, and cache line state bitmap 224 in additional detail. Cache line state bitmap 224 is stored in off-FPGA memory 106b instead of the higher performance on-FGPA memory 226 because the number of cache lines that are tracked are in the millions and the memory requirements of the full bitmap would be too large for on-FGPA memory 226.

As described above, cache line tracker 218 employs cache 228 to speed up memory accesses to cache line state bitmap 224. In the embodiments, cache 228 is configured as a k-way set associative cache in on-FPGA memory 226. For sake of illustration, k is selected to be 4 in FIG. 3 and one cache block is 64 bytes. If one state is tracked per cache line, one cache block would contain state information for 512 cache lines. More generally, if j states are tracked per cache line, one cache block would contain state information for 512/j cache lines. To simplify the description, it will be assumed hereinafter that one state is tracked per cache line. In addition, to illustrate the mapping of different groups of cache blocks into the different sets of cache 228, cache line state bitmap 224 is depicted in FIG. 3 with corresponding set numbers, S1, S2, . . . , Sn, and with imaginary partitions. Accordingly, when fetched from on-FPGA memory 226 into cache 228, a cache block would be stored in one of k ways (in this example, k=4) configured for the corresponding set in cache 228. If all k ways of the set are full, one of the cache blocks is evicted from the set and stored in victim buffer 230B. Tags are stored along with the cache blocks to uniquely identify cache blocks of the same set. As is well known in the art, upper address bits of a cache block make up the tag for that cache block.

Cache line tracker 218 employs tracker data structure 232 when searching for cache lines with modified states, i.e., state bit set to one. Tracker data structure 232 is implemented herein as a hierarchical data structure. In the embodiments illustrated herein, tracker data structure 232 has three levels, hereinafter referred to as top level, intermediate level, and the bottom level. Each level of tracker data structure 232 has bits and each cache line has a corresponding bit in each of the levels of tracker data structure 232. The bits of tracker data structure 232 corresponding to a particular cache line are located using the cache line address.

The bottom level of tracker data structure 232 has a plurality of bit vectors, where each bit of the bit vectors represents the combined state of a group of cache lines whose individual states are stored in one cache block. For example, if the state that is being tracked is whether or not a cache line is modified, the bit at the bottom level of tracker data structure 232 would be set if any one of the cache lines in the group is modified. The intermediate level of tracker data structure 232 also has a plurality of bit vectors, where each bit is associated with a bit vector at the bottom level of tracker data structure 232 and is set if any one of the bits of the associated bit vector is set. The top level of tracker data structure 232 has M bits, where each bit is associated with a bit vector at the intermediate level of tracker data structure 232 and is set if any one of the bits of the associated bit vector is set. Updates to tracker data structure 232 in response to monitored cache line events are described in conjunction with FIGS. 4 and 5, and the search for cache line states using tracker data structure 232 is described in conjunction with FIG. 7.

Figure 4:
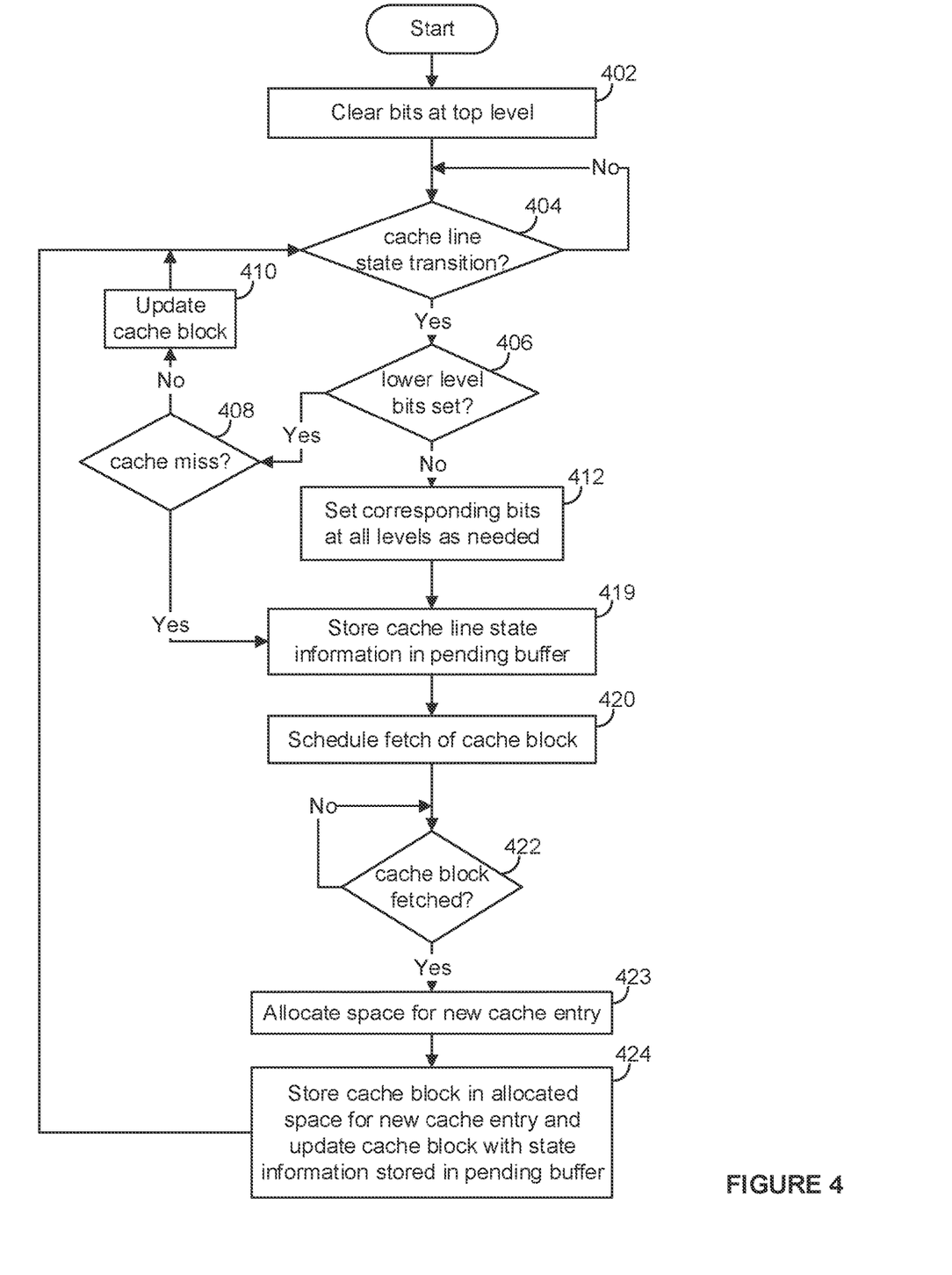
FIG. 4 is a flow diagram that illustrates a method of setting states of cache lines.

FIG. 4 is a flow diagram that illustrates a method of updating tracker data structure 232. In the embodiments illustrated herein, the state of cache lines that is tracked is whether or not the cache line is modified, exclusive, shared, or invalid. In alternative embodiments, other states of cache lines may be tracked, and more than one state may be tracked. If more than one state is tracked, then each cache block will contain state information for 512/j cache lines, where j is the number of states tracked.

The method of FIG. 4 is executed by cache line tracker 218 and begins at step 402 where cache line tracker 218 clears the bits at the top level of tracker data structure 232. Step 402 is executed once (for example, during initialization) and the remaining steps of FIG. 4 are executed each time cache line tracker 218 determines at step 404 that a state transition of a cache line has occurred (e.g., cache line is modified) from cache line events monitored by and received from cache protocol agent 220. If a cache line state transition is determined (step 404; Yes), cache line tracker 218 locates the bits at all levels of tracker data structure 232 corresponding to the cache line using the cache line address. Then, cache line tracker 218 determines at step 406 if the bits at the lower levels of tracker data structure 232 corresponding to the cache line are already set. If they are (Step 406; Yes), cache line tracker 218 at step 408 checks to see if a cache block that contains the state of the cache line is already stored in cache 228. If there is a cache hit, the cache block already stored in cache 228 is updated to set the bit in the cache block corresponding to the cache line (step 410). If there is a cache miss, the flow of execution proceeds to step 419, which is described below.

If the bits at the lower levels of tracker data structure 232 corresponding to the cache line are not set (Step 406; No), cache line tracker 218 at step 412 sets all such corresponding bits. Then, cache line tracker 218 at step 419 temporarily stores the state information of the cache line in pending buffer 230A and at step 420 schedules a fetch of the cache block that contains the state of the cache line from cache line state bitmap 224 stored in off-FPGA memory 106b. When the cache block has been fetched (step 422; Yes), cache line tracker 218 at step 423 allocates space for a new cache entry in one of the sets (e.g., S1, S2, . . . , Sn) of cache 228 corresponding to the address in off-FPGA memory 106b where the fetched cache block is stored. The space allocation for the new cache entry may cause cache 228 to evict a cache block currently stored in the set to victim buffer 230B. At step 424, cache line tracker 218 stores the fetched cache block in the allocated space for the new cache entry and updates the cache block with the state information of the cache line temporarily stored in pending buffer 230A. After step 424, the flow of execution returns to step 404.

Figure 5:
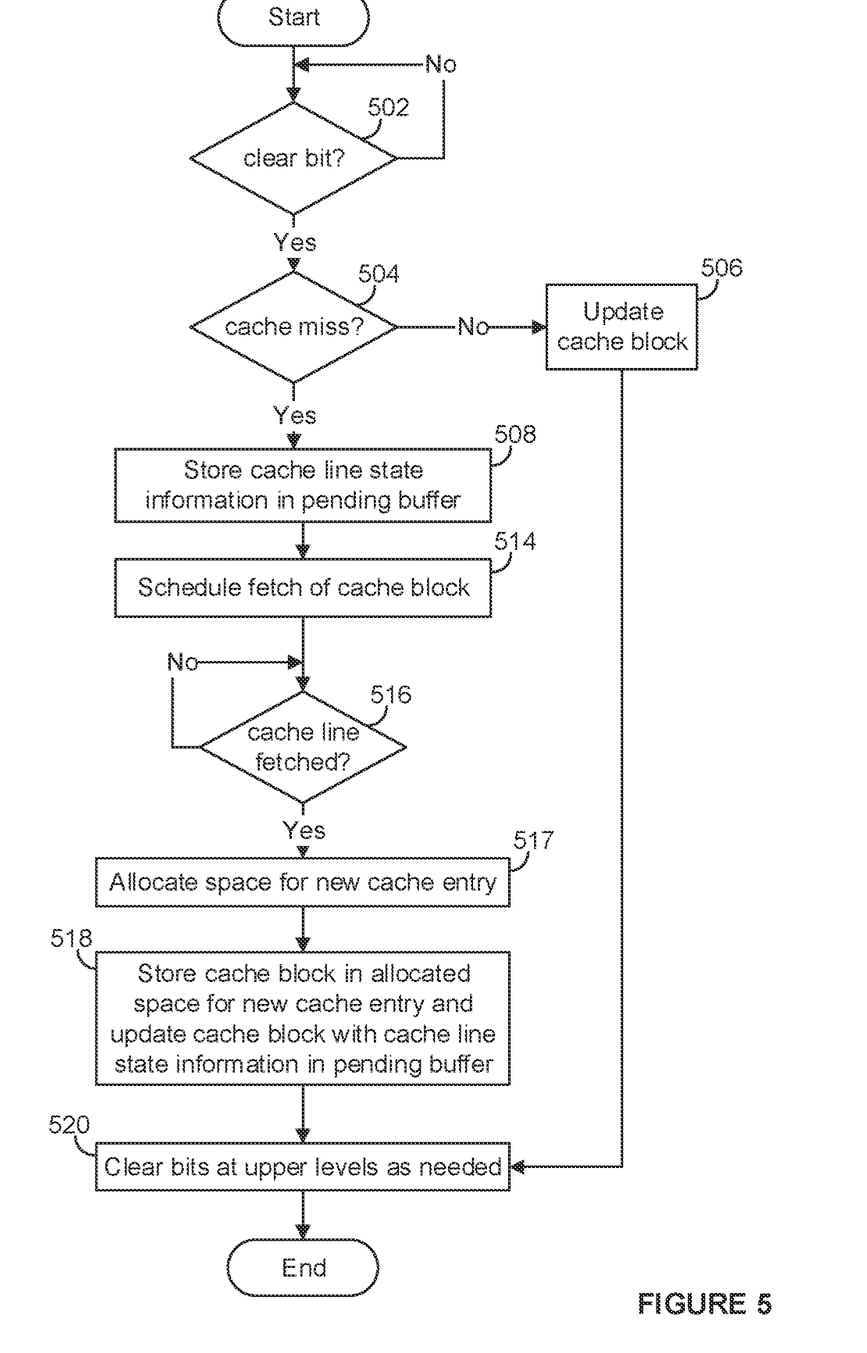
FIG. 5 is a flow diagram that illustrates a method of clearing states of cache lines.

FIG. 5 is a flow diagram that illustrates a method of updating states of cache lines in response to a cache line state clearing event. The method of FIG. 5 is executed by cache line tracker 218 and begins at step 502 when cache line tracker 218 determines at step 502 that a state clearing event for a cache line has been detected by cache protocol agent 220. If so, cache line tracker 218 at step 504 checks to see if a cache block that contains the state of the cache line is already stored in cache 228. If there is a cache hit, the cache block already stored in cache 228 is updated to clear the bit in the cache block corresponding to the cache line (step 506). After this update, step 520, which is described below, is executed next. If there is a cache miss, cache line tracker 218 at step 508 temporarily stores the state information of the cache line in pending buffer 230A. At step 514, cache line tracker 218 schedules a fetch of the cache block that contains the state of the cache line from cache line state bitmap 224 stored in off-FPGA memory 106b When the cache block has been fetched (step 516; Yes), cache line tracker 218 at step 517 allocates space for a new cache entry in one of the sets (e.g., S1, S2, . . . , Sn) of cache 228 corresponding to the address in off-FPGA memory 106b where the fetched cache block is stored. Then, at step 518, cache line tracker 218 stores the fetched cache block in the allocated space for the new cache entry and updates the cache block with the state information of the cache line temporarily stored in pending buffer 230A. At step 520, cache line tracker 218 updates tracker data structure 232 to clear the bits corresponding to the cache line in each of the levels of tracker data structure 232 if all corresponding bits at the lower levels are also clear.

Figure 6:
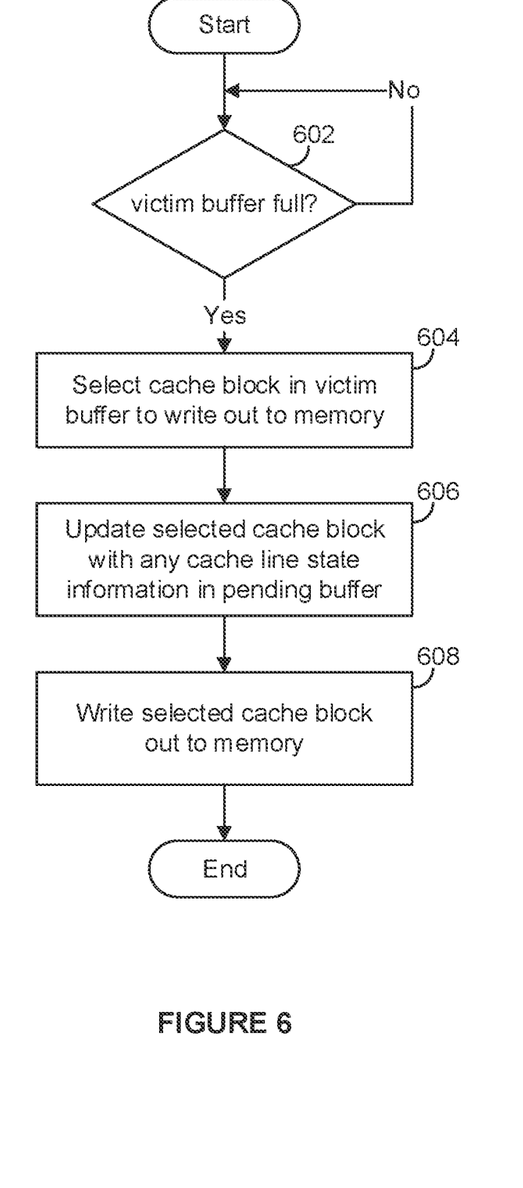
FIG. 6 is a flow diagram that illustrates a method of writing a cache block containing states of cache lines out to memory.

FIG. 6 is a flow diagram that illustrates a method of writing to off-FPGA memory 106b cache blocks that have been moved into victim buffer 230B. The method of FIG. 6 is executed by cache line tracker 218 and begins at step 602 when it detects that victim buffer 230B is full. Then, at step 604, cache line tracker 218 selects a cache block in victim buffer 230B, e.g., the oldest cache block, to write out to off-FPGA memory 106b. Before writing the selected cache block to off-FPGA memory 106b, cache line tracker 218 at step 606 updates the selected cache block with any state information for cache lines thereof that is temporarily stored in pending buffer 230A. The method of FIG. 6 concludes with the writing of the selected cache block to off-FPGA memory 106b at step 608.

Figure 7:
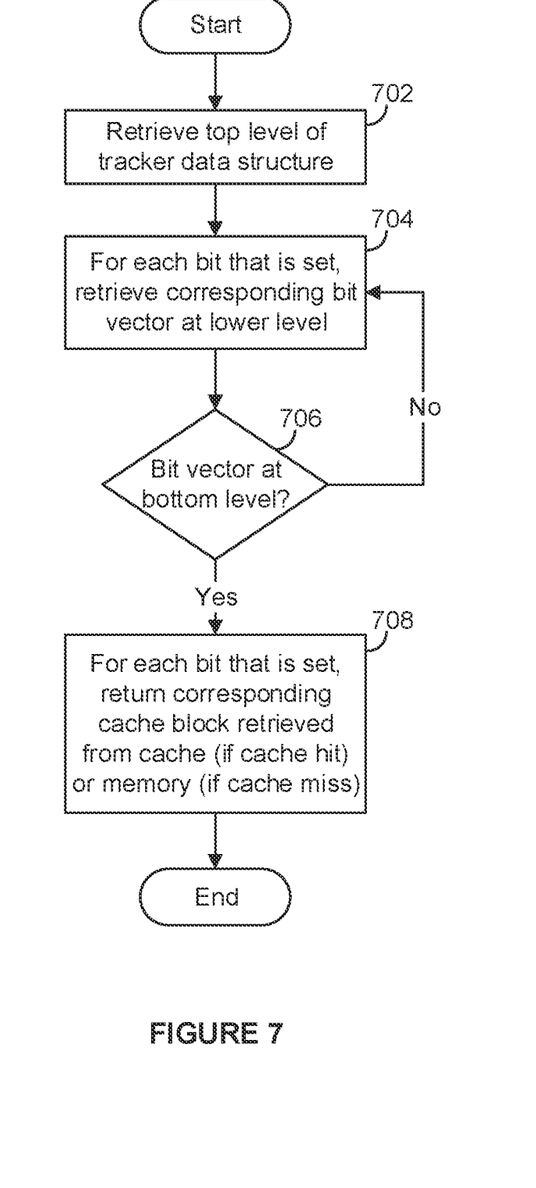
FIG. 7 is a flow diagram that illustrates a method of traversing a hierarchical data structure to locate cache lines having a specified state.

FIG. 7 is a flow diagram that illustrates a method of traversing a hierarchical data structure to locate cache lines having a specified state. The method of FIG. 6 is executed by cache line tracker 218 and in response to a request for all cache lines having the specified state. For example, the request may be made by a live migration module running in hypervisor 111 when carrying out a live migration of VMs, as described in U.S. patent application Ser. No. 16/048,182, filed Jul. 27, 2018, the entire contents of which are incorporated by reference herein.

The method of FIG. 7 begins at step 702 where cache line tracker 218 examines the bits of the top level of tracker data structure 232. Then, step 704 is executed repeatedly using a round robin technique, for example, to locate bit vectors at lower levels of tracker data structure 232 corresponding to those bits that were found to be set any of the upper levels. At step 706, cache line tracker 218 determines whether any of the bit vectors located at step 704 are at the bottom level. If so, cache line tracker 218 at step 708 returns the cache block corresponding to any of the bits that are set at the bottom level of tracker data structure 232 after fetching it in one of two ways. If the cache block is in cache 228, cache line tracker 218 fetches it from cache 228. If the cache block is not in cache 228, cache line tracker 218 fetches it from off-FPGA memory 106b.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers, each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained only to use a defined amount of resources such as CPU, memory, and I/O.

Certain embodiments may be implemented in a host computer without a hardware abstraction layer or an OS-less container. For example, certain embodiments may be implemented in a host computer running a Linux® or Windows® operating system.

The various embodiments described herein may be practiced with other computer system configurations, including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system. Computer-readable media may be based on any existing or subsequently developed technology for embodying computer programs in a manner that enables them to be read by a computer. Examples of a computer-readable medium include a hard drive, network-attached storage (NAS), read-only memory, random-access memory (e.g., a flash memory device), a CD (Compact Discs)—CD-ROM, a CDR, or a CD-RW, a DVD (Digital Versatile Disc), a magnetic tape, and other optical and non-optical data storage devices. The computer-readable medium can also be distributed over a network-coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of tracking state of cache lines that are transferred into and out of one or more caches of processing hardware from and into system memory, the method comprising:

storing a bitmap that indicates the state of the cache lines in the system memory;

monitoring the processing hardware for cache coherence events on a coherence interconnect that is connected between the processing hardware and monitoring hardware;

determining, based on the monitoring, that the state of a cache line has changed from a first state to a second state; and updating a hierarchical data structure and a cache for the bitmap, both of which are stored in a local memory of the monitoring hardware that is different from the system memory and has a smaller capacity and higher memory access speeds than the system memory, to indicate the change in the state of said cache line from the first state to the second state, wherein the hierarchical data structure includes a first level data structure including a plurality of first bits, and a second level data structure including a plurality of second bits, each of the first bits associated with a group of the second bits, and the updating includes setting one of the first bits and one of the second bits in the group corresponding to the first bit that is being set, according to an address of said cache line.

2. The method of claim 1, wherein the first state of said cache line is a not-modified state and the second state of said cache line is a modified state.

3. The method of claim 1, wherein the second bit that was set by the updating is associated with a first cache line group including said cache line, and indicates that the state of at least one cache line in the first cache line group is in the second state.

4. The method of claim 3, further comprising:
determining that bits representing the states of all cache lines in the first cache line group are currently stored in the local memory; and
setting one of the bits corresponding to said cache line to indicate that the state of said cache line is in the second state.

5. The method of claim 3, further comprising:
determining that bits representing the states of all cache lines in the first cache line group are not currently stored in the local memory;
fetching the bits representing the states of all cache lines in the first cache line group from the system memory;
storing the bits representing the states of all cache lines in the first cache line group in the local memory; and
setting one of the bits corresponding to said cache line to indicate that the state of said cache line is in the second state.

6. The method of claim 1, wherein
each of the second bits is associated with a cache line group and indicates whether the state of at least one cache line in the cache line group is in the second state, and
one of the second bits is associated with a first cache line group including said cache line and indicates whether the state of at least one cache line in the first cache line group is in the second state, and another one of the second bits is associated with a second cache line group of cache lines and indicates whether the state of at least one cache line in the second cache line group is in the second state.

7. The method of claim 6, further comprising:
determining, based on the monitoring, that the state of another cache line, which is in the second cache line group, has changed from the second state to the first state;
clearing one of a plurality of bits representing the states of all cache lines in the second cache line group; and
upon determining that all of the bits representing the states of all cache lines in the second cache line group are clear, clearing the second bit associated with the second cache line group.

8. The method of claim 7, further comprising:
upon determining that all of the second bits associated with the first bit are clear, clearing the first bit.

9. The method of claim 7, further comprising:
in response to a request to return cache lines that are in the second state, traversing the hierarchical data structure to find first bits that are set, and for each first bit that is set, second bits in a group of second bits corresponding thereto that are also set, and returning the states of all cache lines associated with the second bits that were found by traversing the hierarchical data structure.

10. A non-transitory computer-readable medium comprising instructions that are executable on a monitoring hardware that is connected to a processing hardware by a coherence interconnect, wherein the instructions, when executed on the monitoring hardware, cause the monitoring hardware to carry out a method of tracking state of cache lines that are transferred into an out of one or more caches of the processing hardware from and into system memory, said method comprising:
storing a bitmap that indicates the state of the cache lines in the system memory;
monitoring the processing hardware for cache coherence events on a coherence interconnect that is connected between the processing hardware and monitoring hardware;
determining, based on the monitoring, that the state of a cache line has changed from a first state to a second state; and
updating a hierarchical data structure and a cache for the bitmap, both of which are stored in a local memory of the monitoring hardware that is different from the system memory and has a smaller capacity and higher memory access speeds than the system memory, to indicate the change in the state of said cache line from the first state to the second state, wherein
the hierarchical data structure includes a first level data structure including a plurality of first bits, and a second level data structure including a plurality of second bits, each of the first bits associated with a group of the second bits, and
the updating includes setting one of the first bits and one of the second bits in the group corresponding to the first bit that is being set, according to an address of said cache line.

11. The non-transitory computer readable medium of claim 10, wherein the second bit that was set by the updating is associated with a first cache line group including said cache line, and indicates that the state of at least one cache line in the first cache line group is in the second state.

12. The non-transitory computer readable medium of claim 11, wherein the method further comprises:
determining that bits representing the states of all cache lines in the first cache line group are currently stored in the local memory; and setting one of the bits corresponding to said cache line to indicate that the state of said cache line is in the second state.

13. The non-transitory computer readable medium of claim 11, wherein the method further comprises:
determining that bits representing the states of all cache lines in the first cache line group are not currently stored in the local memory;
fetching the bits representing the states of all cache lines in the first cache line group from the system memory;
storing the bits representing the states of all cache lines in the first cache line group in the local memory; and
setting one of the bits corresponding to said cache line to indicate that the state of said cache line is in the second state.

14. A computer system comprising:
processing hardware including one or more caches;
monitoring hardware connected to the processing hardware by a coherence interconnect, the monitoring hardware including local memory; and
system memory accessible connected to the processing hardware by a first bus and to the monitoring hardware by a second bus, wherein the system memory is different from the local memory and has a larger capacity and lower memory access speeds than the local memory,
wherein the monitoring hardware is configured to carry out a method of tracking state of cache lines that are transferred into the one or more caches of the processing hardware from and into the system memory, said method comprising:
storing a bitmap that indicates the state of the cache lines in the system memory;
monitoring the processing hardware for cache coherence events on a coherence interconnect that is connected between the processing hardware and monitoring hardware;
determining, based on the monitoring, that the state of a cache line has changed from a first state to a second state; and
updating a hierarchical data structure and a cache for the bitmap, both of which are stored in the local memory of the monitoring hardware, to indicate the change in the state of said cache line from the first state to the second state, wherein
the hierarchical data structure includes a first level data structure including a plurality of first bits, and a second level data structure including a plurality of second bits, each of the first bits associated with a group of the second bits, and
the updating includes setting one of the first bits and one of the second bits in the group corresponding to the first bit that is being set, according to an address of said cache line.

15. The computer system of claim 14, wherein
each of the second bits is associated with a cache line group and indicates whether the state of at least one cache line in the cache line group is in the second state, and
one of the second bits is associated with a first cache line group including said cache line and indicates whether the state of at least one cache line in the first cache line group is in the second state, and another one of the second bits is associated with a second cache line group of cache lines and indicates whether the state of at least one cache line in the second cache line group is in the second state.

16. The computer system of claim 15, wherein the method further comprises:
determining, based on the monitoring, that the state of another cache line, which is in the second cache line group, has changed from the second state to the first state;
clearing one of a plurality of bits representing the states of all cache lines in the second cache line group; and
upon determining that all of the bits representing the states of all cache lines in the second cache line group are clear, clearing the second bit associated with the second cache line group.

17. The computer system of claim 16, wherein the method further comprises:
upon determining that all of the second bits associated with the first bit are clear, clearing the first bit.

18. The computer system of claim 16, wherein the method further comprises:
in response to a request to return cache lines that are in the second state, traversing the hierarchical data structure to find first bits that are set, and for each first bit that is set, second bits in a group of second bits corresponding thereto that are also set, and returning the states of all cache lines associated with the second bits that were found by traversing the hierarchical data structure.

* * * * *